United States Patent [19]

Cunningham et al.

[11] 4,375,659
[45] Mar. 1, 1983

[54] ELECTRONIC CIRCUIT FOR THE DETECTION AND ANALYSIS OF NORMAL ZONES IN A SUPERCONDUCTING COIL

[75] Inventors: Steven M. Cunningham, La Mesa; James C. Marsden, La Jolla; Hubert G. Arrendale, Jr., San Diego, all of Calif.

[73] Assignee: General Dynamics Corporation/Convair Div., San Diego, Calif.

[21] Appl. No.: 303,731

[22] Filed: Sep. 21, 1981

[51] Int. Cl.³ .............................................. H02H 3/02
[52] U.S. Cl. ..................................... 361/19; 307/306; 361/141
[58] Field of Search .................. 361/19, 141; 307/306; 365/160

[56] References Cited

U.S. PATENT DOCUMENTS

| | | | |
|---|---|---|---|
| 3,214,637 | 10/1965 | Persson | 361/19 |
| 3,579,035 | 5/1971 | Burnier et al. | 361/19 |
| 4,271,443 | 6/1981 | Nöther | 361/19 |

OTHER PUBLICATIONS

"Detection of Normal Transition and Energy Removal on Superconducting Magnet", Kimura et al., pp. 944-948, 8/29/77.

*Primary Examiner*—Reinhard J. Eisenzopf
*Attorney, Agent, or Firm*—John R. Duncan; Frank D. Gilliam

[57] ABSTRACT

A method of detecting and analyzing normal zones in a superconducting coil which involves generating a signal representative of the real power dissipated within the superconducting coil after the background noise and transient conditions within the coil have been accounted for. The power signal is integrated with respect to time to provide a signal proportional to the total energy dissipated within the superconductor which is then compared against a critical reference signal so that a quench signal is generated to immediately disconnect the superconducting coil when the reference signal is exceeded and to allow the coil to discharge its energy into an external device to prevent coil damage. An exemplary circuit for implementing the method is disclosed.

9 Claims, 2 Drawing Figures

ELECTRONIC CIRCUIT FOR THE DETECTION AND ANALYSIS OF NORMAL ZONES IN A SUPERCONDUCTING COIL

BACKGROUND OF THE INVENTION

This invention relates to improvements in superconducting coils and more particularly, but not by way of limitation, to an electronic circuit for the detection and analysis of normal zones in a superconducting coil.

Certain materials have the property, at low temperatures in the neighborhood of the absolute zero point, of becoming superconducting, implying that the resistivity at a certain critcal temperature suddenly sinks to zero. The critical temperature for lead is about 7° K. and for mercury 4° K. This property has been utilized by using superconductors in the magnetizing winding of very large magnets with large field strength. Such magnets are suitably built without an iron circuit. The necessary magnetizing power becomes equal to zero since the superconductor has no resistance, but of course a certain amount of power is consumed in keeping the superconductor at the necessary temperature. Generally, the cooling is performed by means of liquid helium.

Problems arise, however, if for some reason an increased temperature occurs at some point on the superconductor and the superconductivity as a result ceases to exist at this point. The electro-magnetic energy will be large and the damage which may result from transition of the superconductive winding to a resistive state may be extensive. This damage may result from carbonization of insulators, fusion of conductors and deformation of mechanical supports, all of which are extensive and difficult to repair, as well as resultant unsafe conditions due to rapid evaporation of a large quantity of liquid helium or other cryogenic fluid.

The process of a portion of a superconducting coil going resistive may also become explosive since the very large magnetic energy of the magnet coil will be discharged in a short time in the non-superconducting zone, which will be very short as the heat generated by current losses in the zone will not have time to spread to other parts of the coil.

It is necessary to be able to detect transistion of any portion of a superconducting coil as soon as this transition occurs, from superconductive to resistive state. If the length affected by the transition is small, remedial measures may still be taken. The total length, however, of superconductive windings in powerful magnets may be substantial. Yet, the resistance of the short length of the superconductor, even when in the resistive state, may be very small, since the sheathing of a superconductive wire is by a very pure metal which, in turn, in the liquid helium also reveals a very small resistance.

The resistive voltage drop, that is the IR drop, to be detected upon a transition is thus very small, in the order of a millivolt or fraction of a millivolt. The self induced potential, that is the voltage drop due to self induction (L di/dt) which appears at the terminals of the winding is, however, substantial and often in the order of tens, or more volts. If the current through the super conductive coil is varied to obtain a constant field, potential drops will likewise appear across the terminals during the variations, until a stead state is again obtained.

It is thus necessary to detect the resistive voltage drop in the order of a minor fraction of a millivolt, which might indicate a change of a portion of the superconductor to resistive state, entirely apart from the potentials due to self induction.

There have been efforts in the past to provide means for indicating the ceasing of superconductivity in a superconducting coil. U.S. Pat. No. 3,214,637 discloses such a device wherein a non-superconducting conductor is arranged to follow a superconductor closely but being electrically insulated therefrom. A voltage sensing device is arranged between the end points of the superconductor and the non-superconductor so that upon the occasion of a fault in the superconductor a voltage difference exists between these two end points and the voltage sensing device then operates to break the current in the superconductor. As noted this device requires an additional parallel coil in the close association to the superconductor and senses voltage to determine a quench condition.

U.S. Pat. No. 3,579,035 discloses the location of an auxiliary winding adjacent to the main winding of a superconductive coil with the flux relationship between the flux generated by the main winding and by the auxiliary winding being a predetermined factor. Upon transition from a superconductive state to resistant state of any portion of the main winding, the IR drop in the superconductive winding will appear as a signal between the superconductive winding and the auxiliary winding, irrespective of inductive voltages. This signal is compared with a voltage drop across a resistance in the supply of the main winding to obtain an alarm which can be used to disconnect the superconductive coil from a power supply. Again an additional coil is provided to generate voltage differences between the superconducting coil and an auxiliary or pick up coil with no attempt to measure instantaneous power.

SUMMARY OF THE INVENTION

Briefly stated, the present invention contemplates a novel method for the detection and analysis of normal zones in a superconducting coil which is implemented by a balanced bridge circuit coupled to a superconducting coil and producing an output voltage signal proportional to the inductance and series resistance of the coil. Means are coupled to the bridge circuit to receive the output voltage signal and to multiply it by a signal representing current in the superconducting coil, the resultant signal representing the real power dissipted in the superconducting coil.

Means are coupled to the multiplying means to subtract from the resultant signal a signal representing the background power loss in the superconducting coil and then to integrate the difference signal with respect to time to generate a signal representing the energy being dissipated within the superconducting coil. Means coupled to the integrating means then compare that signal against a signal representing a critical energy reference and to provide a quench signal when the critical energy reference is exceeded. Means connected to the comparing means disconnects the superconducting coil from its power source upon receipt of a quench signal and allows the coil to discharge its energy into an external device to prevent coil damage.

The above and other aspects of the present invention will be apparent as the description continues and when read in conjunction with the appended drawings.

BRIEF DESCRIPTION OF THE DRAWINGS

Referring now to the drawings in detail, and in particular to FIG. 1, reference character 10 designates one embodiment of a quench detector constructed in accordance with this invention. The quench detector 10 includes a balanced bridge circuit 12 that comprises a suitable isolation amplifier 14 that is connected across a center tapped superconducting coil 16 that is separated by a center tap 18 into first and second coil portions 20 and 22 having inductances L1 and L2, respectively. The superconducting coil 20 is also represented as having an internal resistance 24 and a distributed capacitance 26. The superconducting coil 16 is located in a suitable cryogenic environment, not shown for ease of illustration, and is provided with a suitable electric power source shown generally at 28.

The current source 28 which may have some ripple produces a voltage across the coil 16 that is proportional to inductance and series resistance of the coil 16. The isolation amplifier 14, which is connected in bridge arrangement with balancing resistor 30 across the center tap 18 of the coil 16, subtracts those signals appearing on either side of the center tap 18. The difference signal (Vr+VL1−VL2)t appearing on the output lead 32 of the amplifier 14 has been amplified and is now applied to amplifier 34.

Figure 1:
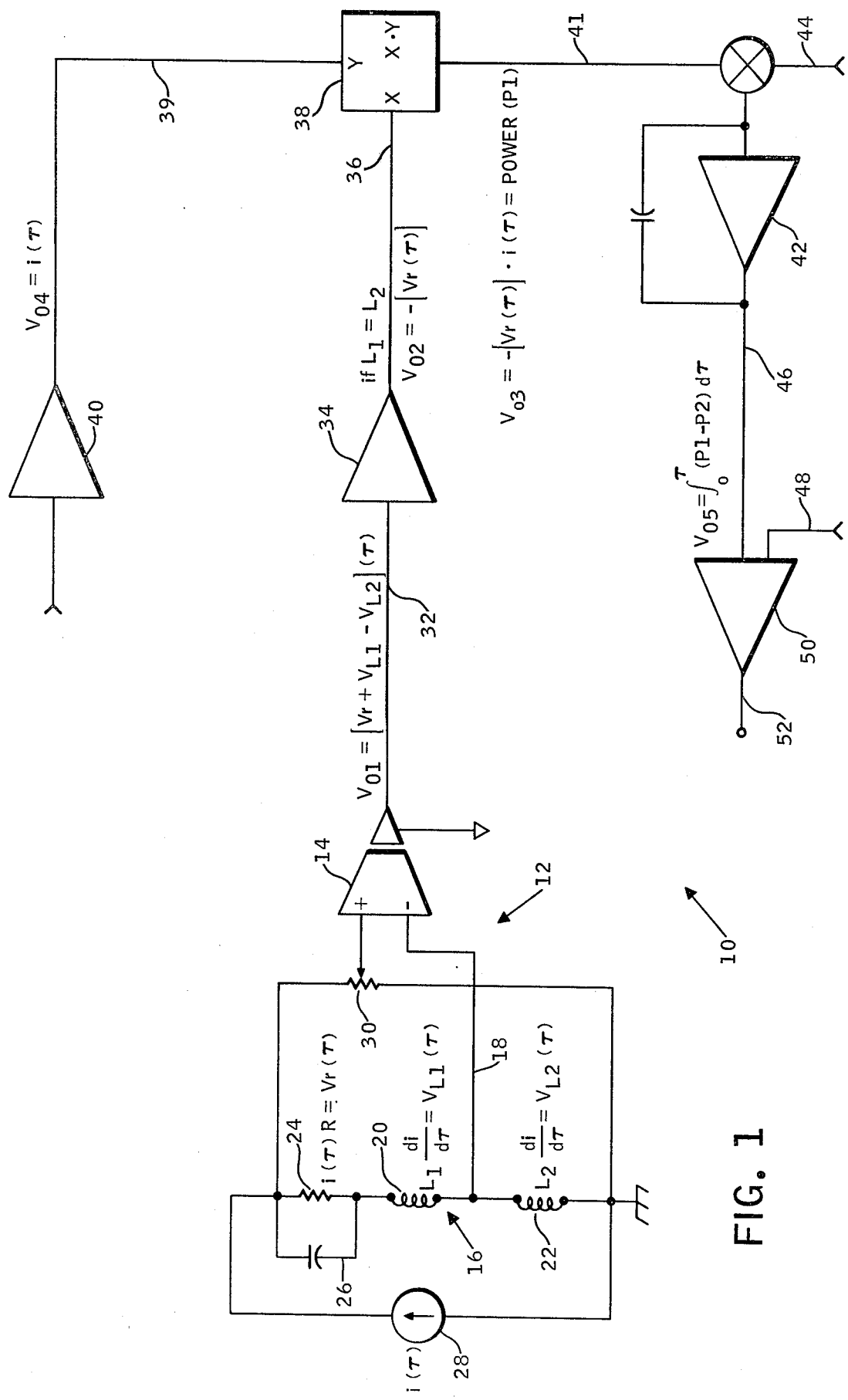

The polarity of the difference signal depends on whether the unbalance appears in the top or bottom half of the bridge circuit 12. Since the polarity of a real difference signal should always be constant, amplifier 34, acting as a full wave rectifier, provides an absolute negative gain. As shown in the illustrated example of $L_1 = L_2$ of the coil 16 then the signal appearing on the output lead 36 of the amplifier 34 will be $-(Vr(t))$.

The difference signal is then applied to the input of a multiplying means shown diagrammatically at 38 which multiplies the difference signal by a level appearing on input lead 39 which represents the current in the coil 16 as sensed by a suitable amplifier means 40. The product resultant signal $-(Vr(t) \cdot i(t))$ appearing on output lead 41 will then represent the real power, P1, being dissipated in the superconducting coil 16 and may be scaled in watts.

The signal representing the measured power loss then has subtracted from it at amplifier 42 a scalable background power loss, P2, appearing on lead 44 and integrates the difference signal with respect to time. The scalable background power loss enables the quench detector 10 to differentiate between a true quench condition and a non-quench mechanism such as superconductor movement, power supply ripples and charge/discharge conditions.

This integral, $S_o + \int(P1-P2) dt$ represents energy and can be scaled in watt-seconds or joules. The integral or energy signal appearing on output lead 46 of amplifier 42 is then compared to a selectable critical energy reference signal appearing on input lead 48 by a suitable amplifier means 50 which provides a quench signal on output lead 52 when the energy reference is exceeded. The quench signal appearing on lead 52 may be then utilized to activate means, not shown in FIG. 1, to immediately disconnect the superconducting coil 16 from its power source 28 to preclude any damage thereto and permit the coil 16 to discharge its energy into a suitable external device (not shown) such as, for example, a steel block having an internal resistance in the order of 26 milli-ohms capable of dissipating 100 mega-joules of energy.

Figure 2:
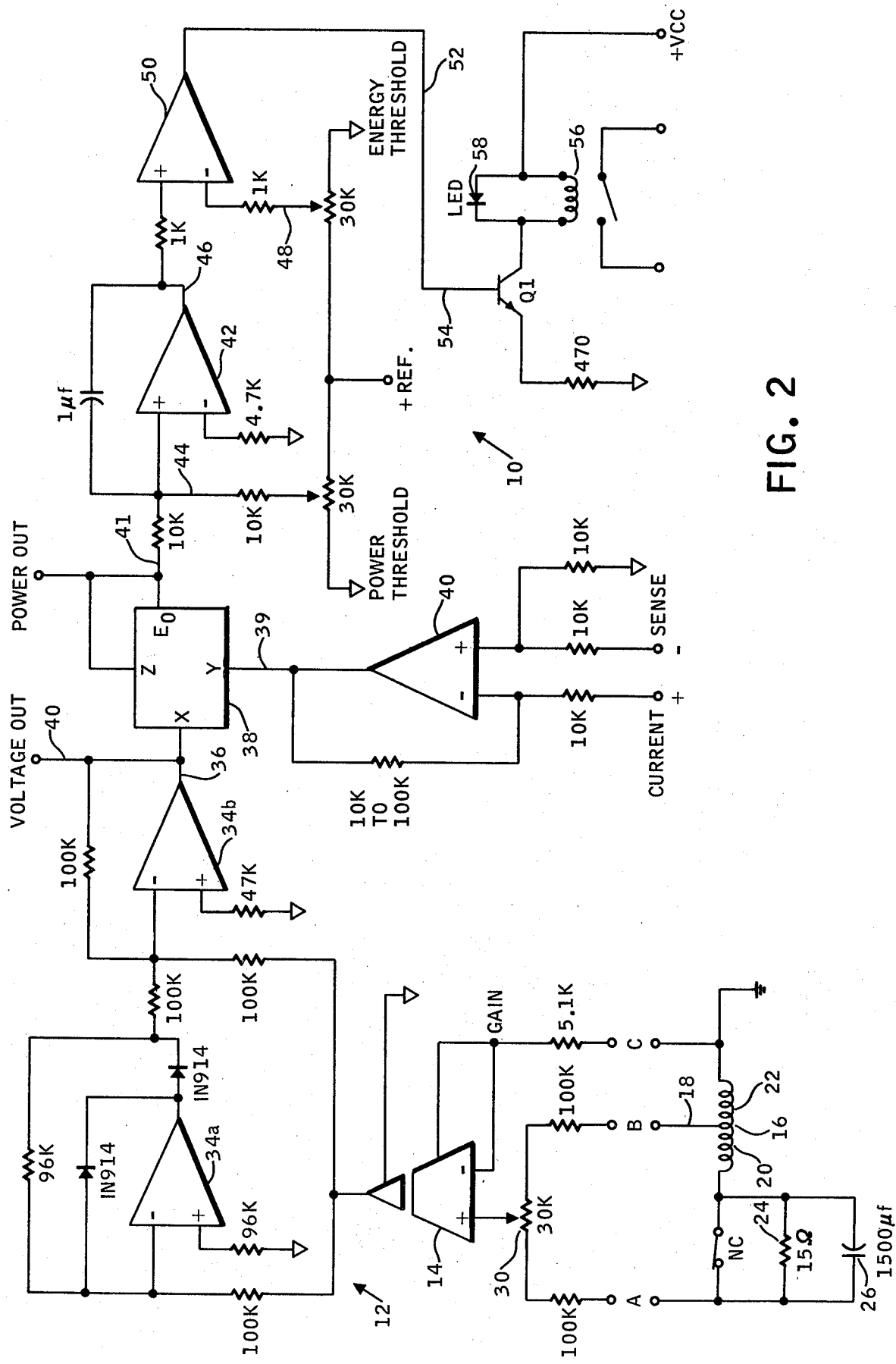

Referring now to FIG. 2, the schematic diagram shown therein illustrates in greater detail the generalized diagrammatic representation of the novel quench detector 10 shown in FIG. 1. In FIG. 2, the reference characters apearing therein represent the same values, devices, structures and the like as they did in FIG. 1 and illustrate in greater detail a quench detector which has been constructed in accordance with the present invention and the specific arrangement of the parts as illustrated therein is intended to be exemplary and not limiting.

The quench detector of 10 performs with a sensitivity down to 1.2 mv for a simulated quench signal with a common mode noise rejection of −77 db which shows a high degree of noise immunity.

As before, the balanced bridge circuit 14 is electrically coupled to a superconducting coil and produces an output voltage signal proportional to the inductance and resistance of the coil 16. The amplifier 14 of the bridge circuit may be by way of illustration a IA184 made by the Intronics Co. of Massachusetts.

The bridge circuit is coupled to the amplifier 34, acting as a full wve rectifier, to provide an absolute negative gain for the difference signal generated by said bridge circuit 12. The amplifier 34 which comprises sections 34a and 34b, amplifier 42, and amplifier 50 were constructed using LM 324 amplifier made by National Semiconductor Co. of California.

The difference signal appearing on lead 36 is then multiplied by amplifier 38 by a voltage level representing current in the coil 16 as sensed by amplifier 40. The product represents the real power dissipated in the coil 16 and may be scaled in watts. The amplifier 38 may be a Model 550 Made by INTECH of California, while amplifier 40 may be a National Model LM 108.

Amplifier 42 then subtracts a scalable background power loss, as provided on lead 40, and integrates the difference with respect to time, which integral may be scaled in watt-seconds or joules.

Amplifier 50 then compares the measured energy to a selectable energy reference provided on lead 48 and provides a quench signal on lead 52 to disconnect the coil 16 when the reference is exceeded. The quench signal appearing on lead 52 is applied to the base of transistor 54 to turn the transistor ON and permit it to conduct current thereby energizing a solenoid 56, for example, to disconnect the coil 16 and to turn on a LED 58 to give a visual display that the coil 16 has been disconnected.

As disclosed above, the instant invention provides a novel quench detector which detects a normal zone propagating in a superconductor which, if undetected, can result in the destruction of the superconducting coil system. The novel invention provides a relationship of power and energy dissipated within the superconducting device and enables the differentiation between transient conditions and destructive quench conditions.

Changes may be made in the combination and arrangement of steps and procedures, as well as in various elements of the apparatus, without departing from the spirit and scope of the following claims.

What is claimed is :

1. In an electronic circuit for the detection and analysis of normal zones in a superconducting coil, the combination of:

a balanced bridge circuit electrically coupled to a superconducting coil and producing an output voltage signal proportional to the inductance and series resistance of the coil;

means coupled to the bridge circuit to receive the output voltage signal and to multiply it by a signal representing current in the superconducting coil, the resultant signal representing the real power being dissipated in the superconducting coil;

means coupled to the multiplying means to receive the signal representing the power being dissipated in the superconducting coil and to subtract from said signal a signal representing the background power loss in the superconducting coil, and then to integrate the difference signal with respect to time to generate a signal on an output lead representing the energy being dissipated within the superconducting coil;

means coupled to said integrating means to receive the signal representing the energy being dissipated within the superconducting coil and to compare it against a signal representing a critical energy reference and to provide a quench signal when the critical energy reference is exceeded; and means connected to the comparing means to receive a quench signal, to disconnect the superconducting coil from its power source and permit dissipation of the stored energy into an external device.

2. The electronic circuit of claim 1 wherein the bridge circuit includes a plurality of isolation amplifers which electrically isolate the differential bridge input by high voltage isolation.

3. The electronic circuit of claim 2 wherein the differential bridge circuit is connected to the superconducting coil as a center taped coil to permit cancellation of commonly occurring noise while providing differential gain to normal zone signals.

4. The electronic circuit of claim 3 wherein the differential bridge circuit subtracts one signal appearing on one side of the center tap from the signal appearing on the other side of the tap to generate a difference signal.

5. The electronic circuit of claim 4 wherein the polarity of the difference signal depends on whether the unbalance appears in the top half or the bottom half of the differential bridge circuit, so that the polarity of a real difference signal should always be constant.

6. The electronic circuit of claim 5 wherein means is provided to amplify the difference signal to provide an absolute negative gain.

7. The method of detecting and analyzing normal zones in a superconducting coil which comprises the steps of:

generating a signal representative of the power dissipated in a super conducting coil;

subtracting from the dissipated power signal a signal representing the background and transient power losses of the superconducting coil to generate a signal representative of the real power dissipated by said coil;

operating on said real power signal to generate a signal representative of the energy dissipated within the superconducting coil; and comparing the energy dissipated signal against a signal representing a critical energy reference and disconnecting the superconducting coil from its power source when said critical energy reference is exceeded.

8. The method of claim 7 wherein the signal representative of the power dissipated in a superconducting coil is generated by generating a signal proportional to the series resistance and current of the coil; and multiplying said proportional signal by a signal representing the level of current flowing through the coil.

9. The method of claim 8 wherein the signal representative of the real power being dissipated in the coil is integrated with respect to time to generate a signal representative of the energy dissipated within the superconducting coil.

* * * * *